United States Patent
H P (10) Patent No.: US 12,231,384 B2
(45) Date of Patent: Feb. 18, 2025

(54) REMINDER NOTIFICATION FOR PERMISSION/ACCESS TO LINKS IN ELECTRONIC MAIL TRANSMISSIONS

(71) Applicant: Avaya Management L.P., Durham, NC (US)

(72) Inventor: Ananda H P, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/825,620

(22) Filed: May 26, 2022

(65) Prior Publication Data

US 2023/0412546 A1 Dec. 21, 2023

(51) Int. Cl.
| | | |
|---|---|---|
| H04L 43/16 | (2022.01) | |
| G06F 16/955 | (2019.01) | |
| H04L 51/08 | (2022.01) | |
| H04L 51/21 | (2022.01) | |
| H04L 51/42 | (2022.01) | |

(52) U.S. Cl.
CPC ............ *H04L 51/21* (2022.05); *G06F 16/955* (2019.01); *H04L 51/08* (2013.01); *H04L 51/42* (2022.05)

(58) Field of Classification Search
CPC ......... H04L 51/21; H04L 51/08; H04L 51/42; G06F 16/955
See application file for complete search history.

(56) References Cited

U.S. PATENT DOCUMENTS

| | | | |
|---|---|---|---|
| 7,016,937 B1 | 3/2006 | Malik | |
| 9,361,473 B2 * | 6/2016 | Chou Fritz | G06F 3/0481 |
| 10,505,956 B1 * | 12/2019 | Pidathala | G06F 21/566 |
| 10,769,350 B2 * | 9/2020 | Meyers, Jr. | G06F 40/106 |
| 2003/0154254 A1 * | 8/2003 | Awasthi | H04L 51/224 |
| | | | 709/206 |
| 2011/0314546 A1 * | 12/2011 | Aziz | H04L 63/126 |
| | | | 726/24 |
| 2017/0316320 A1 * | 11/2017 | Jamjoom | G06Q 10/109 |

OTHER PUBLICATIONS

"Access link-shared files using resource keys," Google, last updated Jul. 29, 2022, 2 pages [retrieved online Aug. 24, 2022 from: developers.google.com/drive/api/guides/resource-keys].
"Authorization Code OAuth flow for SharePoint Add-ins," Microsoft 2021, 16 pages [retrieved online Aug. 24, 2022 from: web.archive.org/web/20211028064217/docs.microsoft.com/en-us/sharepoint/dev/sp-add-ins/authorization-code-oauth-flow-for-sharepoint-add-ins].
"Dropbox for HTTP Developers," Dropbox, date unknown, 424 pages [retrieved online Aug. 24, 2022 from: www.dropbox.com/developers/documentation/http/documentation].
"Share files, folders and drives," Google, last updated Jul. 29, 2022, pages [retrieved online Aug. 24, 2022 from: developers.google.com/drive/api/guides/manage-sharing].

* cited by examiner

*Primary Examiner* — Cheikh T Ndiaye (74) *Attorney, Agent, or Firm* — Sheridan Ross P.C.

(57) ABSTRACT

A method for notifying a sender of an email communication having a link provided therein, to include permission for accessing the link includes receiving an indication of a completion of a formation of an email communication. The method also includes identifying at least one link provided within the email communication. The method further includes sending a notification to the sender that the at least one link is provided within the email communication.

20 Claims, 6 Drawing Sheets

| Recipient List | Read | Write | Recommendation |
|---|---|---|---|
| Amanda | ◎ | ◎ | Read |
| Yolanda | ◎ | ◎ | Write |
| Dean | ◎ | ◎ | Write |
| Robert | ◎ | ◎ | Read |
| Parag | ◎ | ◎ | Read |
| June | ◎ | ◎ | Read |
| Chose Options | Select | | Select |

*FIG. 6*

REMINDER NOTIFICATION FOR PERMISSION/ACCESS TO LINKS IN ELECTRONIC MAIL TRANSMISSIONS

FIELD OF THE DISCLOSURE

The disclosure relates generally to systems and methods for the transmission of electronic mail (i.e., email) over computer networks, and more particularly, to systems and methods for reminding the sender of an email message having a link provided therein, to include permission/access for the link.

BACKGROUND

In message communication systems such as email message communication systems, email messages are typically generated by users on communication devices such as a Personal Computer (PC) for example, and once an email message from a user has been generated, it is forwarded to an email delivery server which hosts the users' email accounts. The email delivery server temporarily stores the email messages in a queue for processing and sending to a recipient or destination email mailbox via an email destination server at which the recipient email mailbox is hosted.

In many cases, the email will contain a link that can be used to navigate to documents, sheets or SharePoint Uniform Resource Locator (URL)s. Once the recipient receives the email, the recipient will normally try to open and read the documents associated with the link. In some cases, the recipient will be denied access to the information provided by the link. The recipient would then have to send a reply email to the sender requesting permission to access the link. This becomes burdensome when the sender sends the email to multiple recipients at one time with the multiple recipients having various levels of access (e.g., some recipients will be able to access the link and other recipients will be unable to access the link). Moreover, the email and the provided link, might be time sensitive and the recipient(s) might not be able to reach the sender in time to inform the sender that the recipient(s) is unable to access the link.

Therefore, there is a need for systems and methods for reminding the sender of an email message having a link provided therein, to include permission/access for the link.

SUMMARY

These and other needs are addressed by the various embodiments and configurations of the present disclosure. The present disclosure can provide a number of advantages depending on the particular configuration.

In one embodiment of the present disclosure, a method for notifying a sender of an email communication having a link provided therein, to include permission for accessing the link includes receiving an indication of a completion of a formation of an email communication. The method also includes identifying at least one link provided within the email communication. The method further includes sending a notification to the sender that the at least one link is provided within the email communication.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A link refers to a word, group of words, or image that can be used, when "clicked," to jump to another document. The link includes, as one of its attributes, a URL indicating the source of the document (e.g., the destination of the jump). The email client can, from the message composing interface, recognize that a URL has been included.

An "email client" or "email application" refers to a program that enables a user to access the user's email. The email client may be a local application running on the user's computing device or a web application accessed by the user via a browser running on the user's computing device.

Example email clients that may implement the techniques and features herein include, but are not limited to, Microsoft Outlook®, IBM Lotus Notes®, Apple® Mail, Google Gmail®, Outlook.com, and Yahoo!® Mail. Email and other electronic messaging services are often incorporated into personal information managers which provide additional services such as calendaring, task management, and contact management.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such as a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
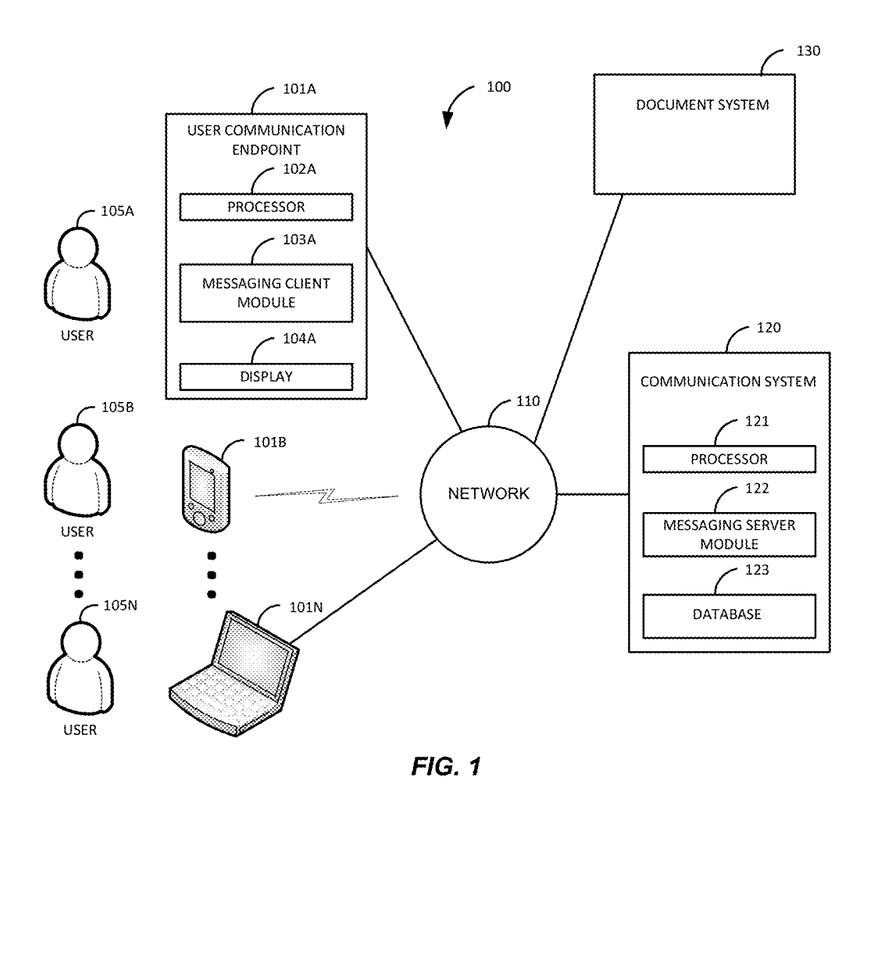
FIG. 1 is a block diagram of a first illustrative computer network system for reminder notification for permission/access to links in an email communication according to an embodiment of the present disclosure.

FIG. 1 is a block diagram of a first illustrative computer network system 100 for reminder notification for permission/access to links in an email communication according to embodiments of the present disclosure. The first illustrative system 100 includes user communication endpoints 101A-101N, network 110, communication system 120 and document system 130. In addition, users 105A-105N are shown being associated with user communication endpoints 101A-101N, respectively. User communication endpoints 101A-101N can be or may include any user communication endpoint device that can communicate on network 110, such as a Personal Computer (PC), a telephone, a video system, a cellular telephone, a Personal Digital Assistant (PDA), a tablet device, a notebook device, a smartphone, handheld computer, laptops, netbooks, subnotebooks, scanners, portable gaming devices, pager, GPS modules, portable music players, and other sound and/or pressure receiving devices. User communication endpoints 101A-101N are devices where a communication session ends. User communication endpoints 101A-101N are not network elements that facilitate and/or relay information in the network, such as a communication server or router.

The term "user communication endpoint" as used herein is not limiting and may be referred to as a user device and mobile device, and variations thereof. A user communication endpoint, as used herein, may include any type of device capable of communicating with one or more of another device and/or across a network, via a communications protocol, and the like. A user communication endpoint may include any type of known communication equipment or collection of communication equipment. A user communication endpoint does not have to be Internet-enabled and/or network-connected. In general, each user communication endpoint may provide many capabilities to one or more users who desire to use or interact with the communication system 120. For example, a user may access the communication system 120 utilizing the network 110.

As shown in FIG. 1, any number of user communication endpoints 101A-101N may be connected to network 110. User communication endpoint 101A further includes a processor 102A, a messaging client module 103A and a display 104A. The processor 102A can be or may include any hardware processor, such as a micro-controller, an application specific processor, a multi-core processor, a digital signaling processor, and/or the like. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, other industry-equivalent processors, and may perform computational functions using any known or future-developed standard, instruction set, libraries, and/or architecture.

According to one embodiment of the present disclosure, the messaging client module 103A can be or may include any client that can be used to send messages such as a text message (e.g., a Short Message Service (SMS)), an instant message, an email message, and a Really Simple Syndication (RSS), Atom (Atom Syndication Format) or Bluetooth message. A message refers herein to any electronic communication that may be presented to a user. The messaging client module 103A can send text messages and/or email messages to messaging server module 122 via network 110. The display 104A can be or may include any hardware display that can display information to user 105A. For example, the display 104A may be a Light Emitting Diode (LED) display, a plasma display, a liquid crystal display, a cathode ray tube, a projector, and/or the like.

Although only user communication endpoint 101A is illustrated and described in detail above, each of the user communication endpoints 101B-101N includes the same features as user communication endpoint 101A illustrated and described above and therefore their illustration and description has been omitted.

According to one embodiment of the present disclosure, communication endpoint 101A may receive a document through the network 110 from the document system 130. Examples of a document include a web page, a document in a page description language such as a PDF, a work processing document, a database document and a spreadsheet for example. The document system 130 may be any entity capable of providing a document such a web server that provides a document through a protocol such as HTTP. The document system 103 may provide a document that includes an embedded request for secure data entry. A document refers herein to any data that may be referenced by an address, including a file on a document computer file system, an entry in a database table, a web page, and dynamically generated data provided by a server such as an HTTP server.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. Network 110 can use a variety of electronic protocols, such as Ethernet, Internet Protocol (IP), Session Initiation Protocol (SIP), Integrated Services Digital Network (ISDN), email protocols, text messaging protocols (e.g., Short Message Service (SMS)), and/or the like. Thus, network 110 is an electronic communication network configured to carry messages via packets and/or circuit switched communications.

The communication system 120 can be or may include any hardware coupled with software that can manage how communication messages such as for example, text messages, email messages, voice mail messages, etc. are routed between the user communication endpoints 101A-101N. The communication system 120 includes a processor 121, a messaging server module 122 and a database 123. The processor 121 can be or may include any hardware processor, such as a micro-controller, an application specific processor, a multi-core processor, a digital signaling processor, and/or the like. The messaging server module 122 can be or may include any software that can manage how communication messages are routed between the user communication endpoints 101A-101N. The database 123 can be any storage medium that includes information such as for example, customer or subscriber information.

Figure 2:
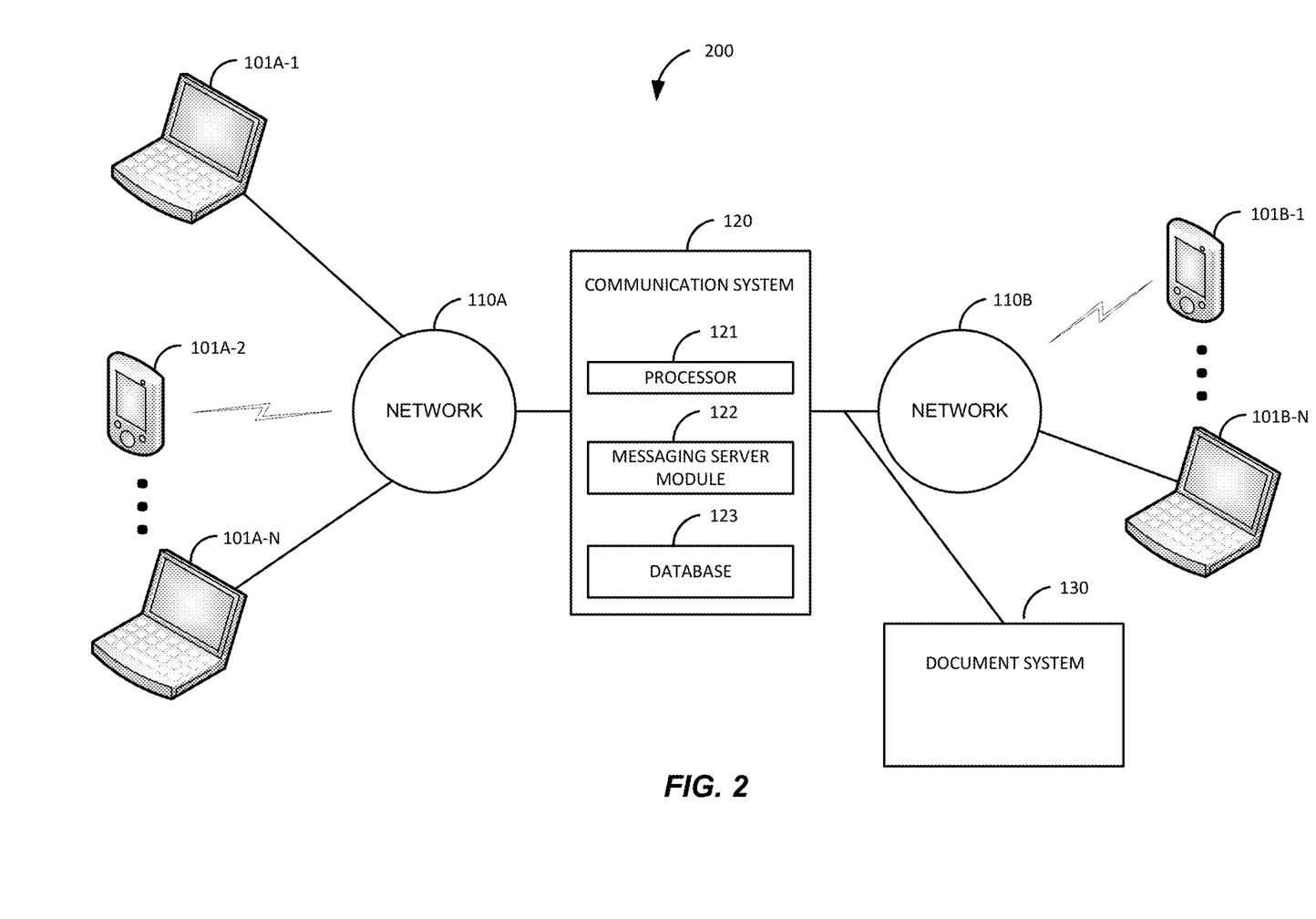
FIG. 2 is a block diagram of a second illustrative computer network system for reminder notification for permission/access to links in an email communication according to an alternative embodiment of the present disclosure.

FIG. 2 is a block diagram of a second illustrative computer network system 200 for reminder notification for permission/access to links in an email communication according to an alternative embodiment of the present disclosure. The second illustrative system 200 includes user communication endpoints 101A-1-101A-N, 101B-1-101B-N, networks 110A-110B, communication system 120 and document system 300. In FIG. 2, network 110A is typically a public network, such as the Internet. Network 110B is typically a private network, such as, a corporate network. In FIG. 2, the communication system 120 is typically used to send communication messages between user communication endpoints 101A-1-101A-N and user communication endpoints 101B-1-101B-N.

Figure 3:
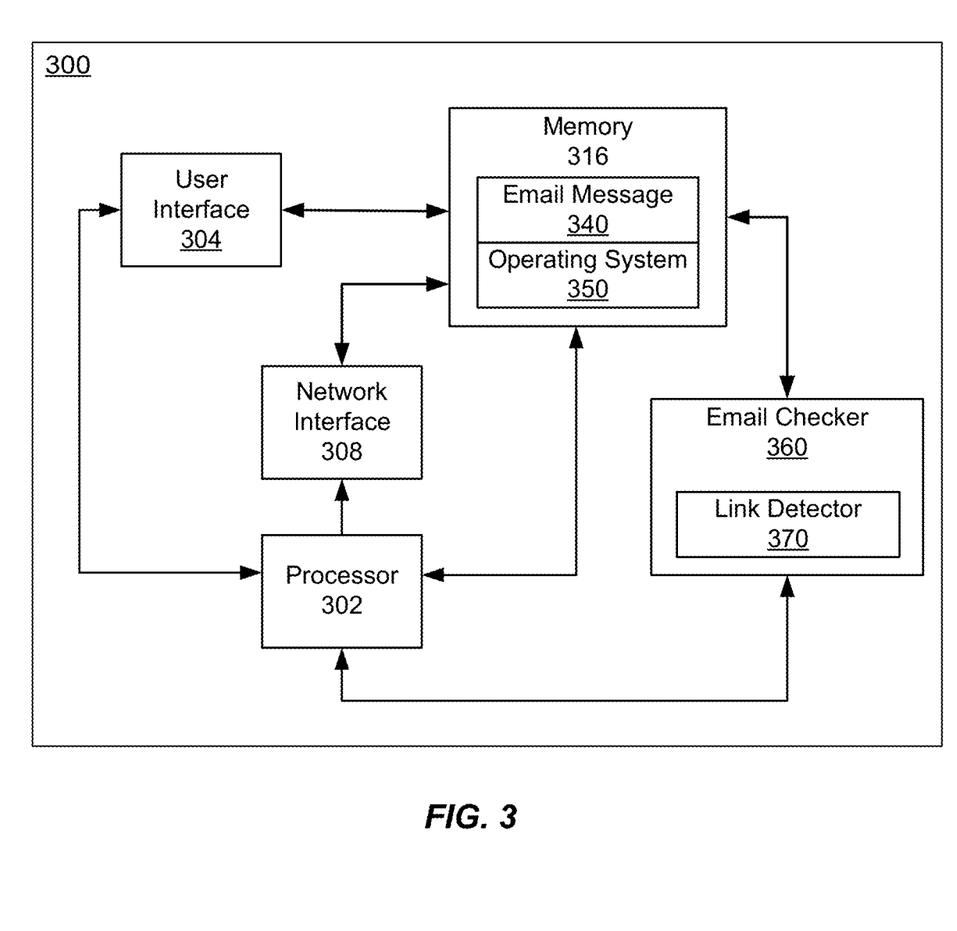
FIG. 3 is a block diagram of an illustrative user communication endpoint for reminder notification for permission/access to links in an email communication according to embodiments of the present disclosure.

FIG. 3 is a block diagram of an illustrative user communication endpoint 300 for reminder notification for permission/access to links in an email communication according to embodiments of the present disclosure. The user communication endpoint 300 may include a user interface 304, a network interface 308, a memory 316, a processor 302 and an email checker 360. The user interface 304 can enable the user or multiple users to interact with the user communication endpoint 300 and is provided for entering email communications to be transmitted. Exemplary user input devices which may be included in the user interface 304 include, without limitation, a button, a mouse, trackball, rollerball, image capturing device, or any other known type of user input device. Exemplary user output devices which may be included in the user interface 304 include without limitation, a speaker, a light, a Light Emitting Diode (LED), a display screen, a buzzer, or any other known type of user output device. In some embodiments of the present disclosure, the user interface 304 includes a combined user input and user output device, such as a touchscreen. Using user interface 304, the user may configure settings via an application (not shown) for setting a notification or a reminder to include the permission/access for the link included in an email. The notification may be in the form of a popup notification provided on the user interface 304. According to an alternative embodiment of the present disclosure, the notification may be a sound notification or vibration notification or any type of notification using one or more of the output devices discussed above, without departing from the spirit and scope of the present disclosure.

The network interface 308 includes components for connecting the communication system to the network. In some embodiments of the present disclosure, a single network interface 308 connects the communication system to multiple networks. In some embodiments of the present disclosure, a single network interface 308 connects the communication system to one network and an alternative network interface is provided to connect the communication system to another network. The network interface 308 may include a communication modem, a communication port, or any other type of device adapted to condition packets for transmission across the network to one or more destination communication endpoints (not shown), as well as condition received packets for processing by the processor 302. Examples of network interfaces 308 include, without limitation, a network interface card, a wireless transceiver, a modem, a wired telephony port, a serial or parallel data port, a radio frequency broadcast transceiver, a USB port, or other wired or wireless communication network interfaces.

The type of network interface 308 utilized may vary according to the type of network which the communication system is connected, if at all. Exemplary networks to which the communication system may connect via the network interface 308 include any type and any number of communication mediums and devices which are capable of supporting communication events (also referred to as "phone calls," "messages," "communications" and "communication sessions" herein), such as voice calls, video calls, chats, emails, TTY calls, multimedia sessions, or the like. In situations where the network is composed of multiple networks, each of the multiple networks may be provided and maintained by different network service providers. Alternatively, two or more of the multiple networks in the network may be provided and maintained by a common network service provider or a common enterprise in the case of a distributed enterprise network.

The memory 316 temporarily stores an email message 340 and also an operating system 350. The operating system 350 generally controls and coordinates the functions of the various components in the user communication endpoint 300, providing an easier way for applications to connect with lower level interfaces like the networking interfaces. Non-limiting examples of operating systems include Windows® from Microsoft Corp., IOS™ from Apple, Inc., Android™ OS from Google, Inc., Windows™ RT from Microsoft Corp., and the Ubuntu® variety of the Linux® OS from Canonical.

Processor 302 processes data according to the instructions of one or more application programs interacting with the operating system 350. Examples of processor 302 include general purpose central processing units, application specific processors, and logic devices, as well as any other type of processing device, combinations, or variations thereof.

The email checker 360 includes a link detector 370 to determine if the email message includes a link. According to embodiments of the present disclosure the link detector 370 determines if the email includes a link for SharePoint URLs, documents, or sheets as discussed in greater detail below. According to further embodiments of the present disclosure, the link detector 370 determines if an attachment in the email message includes a link.

Figure 4:
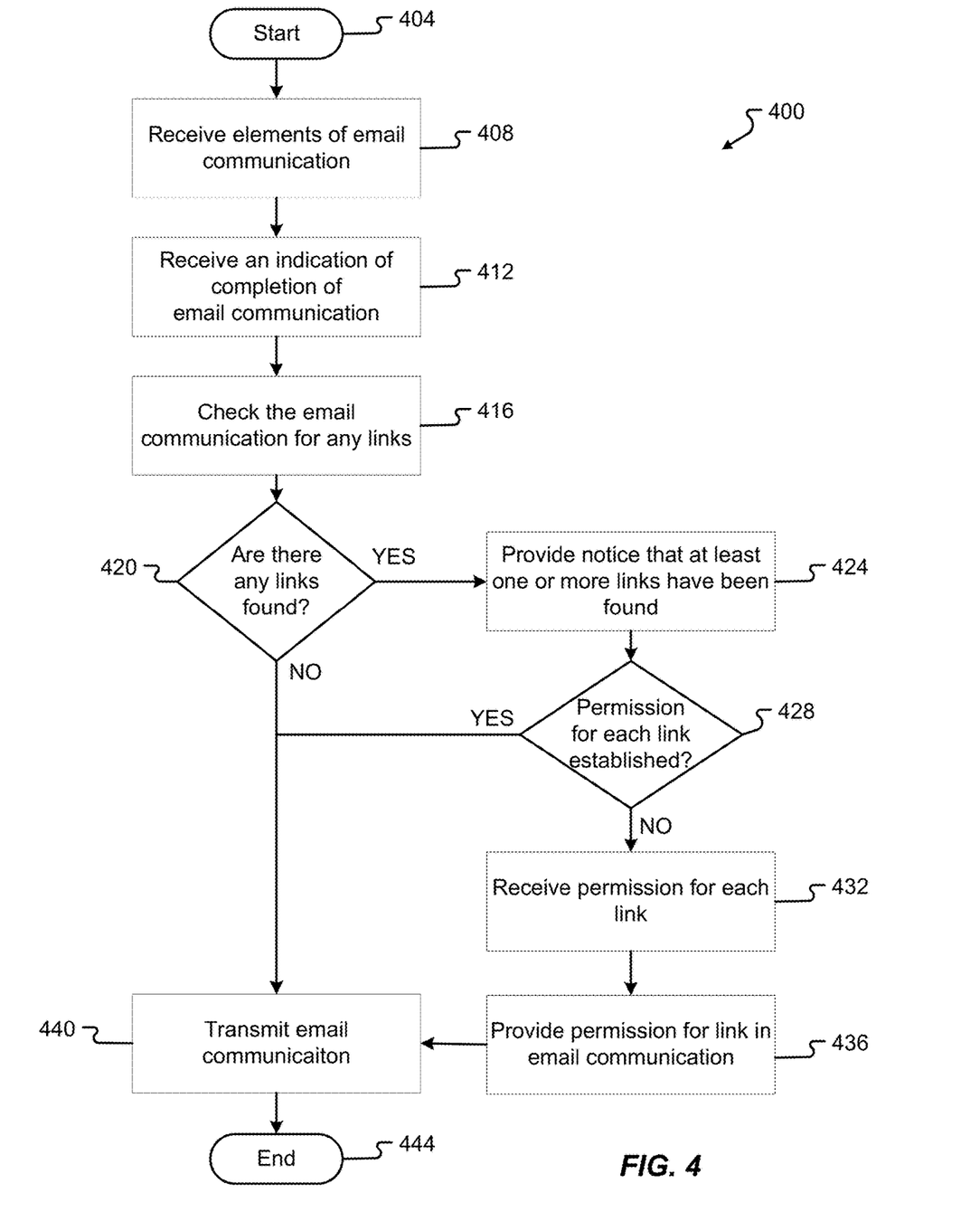
FIG. 4 is a flow diagram of a method for providing reminder notification for permission/access to links in an email communication according to an embodiment of the present disclosure.

FIG. 4 is a flow diagram of a method 400 for providing reminder notification for permission/access to links in an email communication according to an embodiment of the present disclosure. While a general order of the steps of method 400 is shown in FIG. 4, method 400 can include more or fewer steps or can arrange the order of the steps differently than those shown in FIG. 4. Further, two or more steps may be combined into one step. Generally, method 400 starts with a START operation at step 404 and ends with an END operation at step 444. Method 400 can be executed as a set of computer-executable instructions executed by a data-processing system and encoded or stored on a computer readable medium. Hereinafter, method 400 shall be explained with reference to systems, components, modules, software, data structures, user interfaces, etc. described in conjunction with FIGS. 1-3, 5 and 6.

Figure 5:
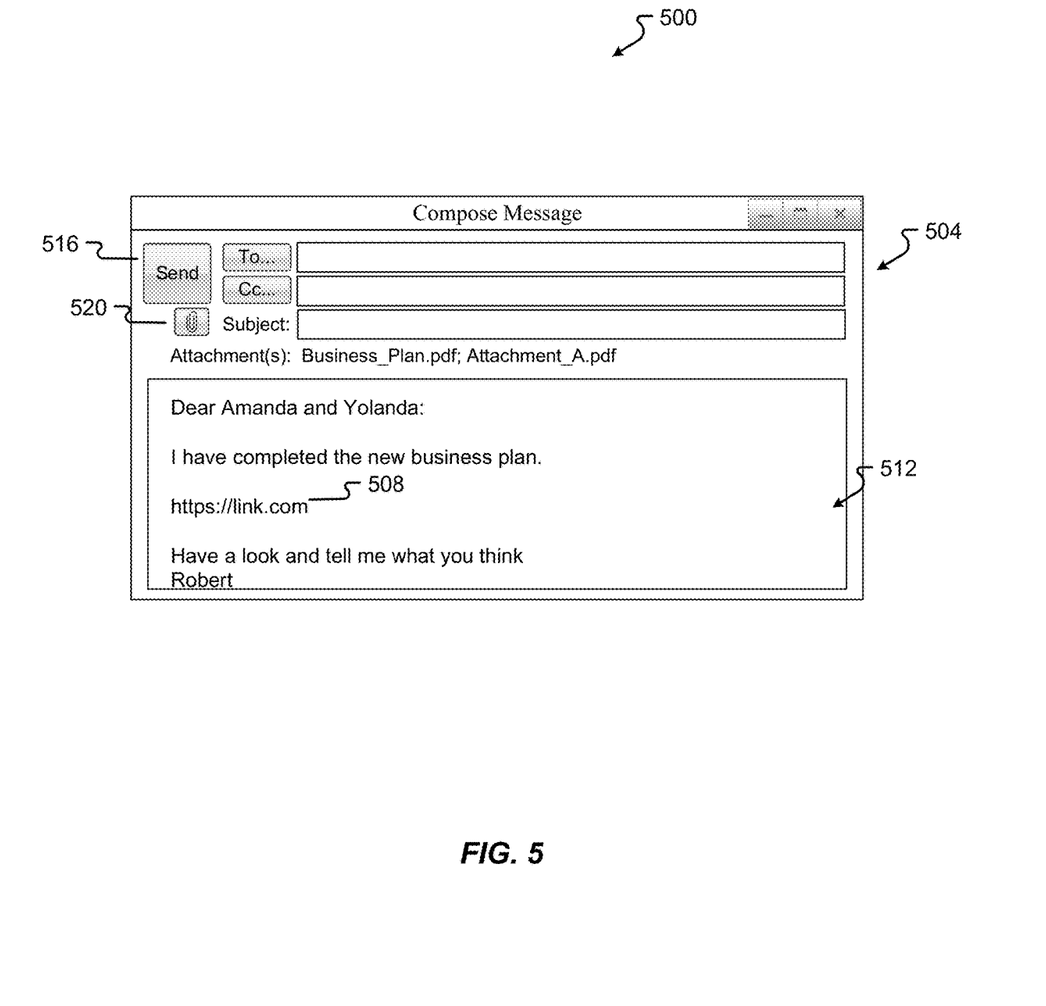
FIG. 5 is a diagram of a user interface for an email communication including a link according to an embodiment of the present disclosure.

Method 400 may begin at START operation at step 404 and proceed to step 408, where the processor 102 of the user communication endpoint 101 using the messaging client module 103 receives elements of an email communication. According to embodiments of the present disclosure, a sender of an email composes the email communication in accordance with a template provided by the messaging client module 103 as illustrated in FIG. 5. FIG. 5 is a diagram of a user interface 500 for an email communication including a link according to an embodiment of the present disclosure.

As illustrated in FIG. 5, an email compose screen 504 includes a link 508. The email compose screen 504 is depicted as part of a "new message" screen, the same process flow of FIG. 4 is also applicable to a "reply" or "forward" screen. The link 508 may be inserted by the user in numerous ways. In the example of FIG. 5, the user places a textual representation of the URL 508 for the document to be shared on the compose surface 512 of the email. The placement of the textual representation of the URL may occur by "pasting" plain text from a browser or other application. A user may also type the URL into the compose surface 512. Placement may also occur by "dragging and dropping" a block of text from a word processor, browser, file manager, or other textual source. The user interface 500 motifs of pasting text using a keyboard, menu, command button, or voice command, and of dragging and dropping text using a mouse or gestural command, are known in the art. Furthermore, as those skilled in the art will recognize, the determination that a user input command has occurred can be performed using any suitable detection method supported by the operating system or software development kit. An "ATTACHMENT" icon 520 is also provided to include attachment documents. As illustrated in FIG. 5 the attached documents "Business_Plan.pdf" and "Attachment_A.pdf" are include in the email communication.

After receiving the elements of the email communication at step 408, method 400 proceeds to step 412, where the processor 102 of the user communication endpoint 101 using the messaging client module 103, receives an indication of the completion of the email communication. According to embodiments of the present disclosure, to indicate the completion of the email communication, the user selects a "SEND" icon 516 on the screen 504, to indicate that the email communication is to be transmitted from the user communication endpoint 101. Of course, this icon could possibly be labelled by one of several other indicators, such as "TRANSMIT", "OKAY", "OK", "DONE" or the like.

After receiving an indication of the completion of the email communication at step 412, method 400 proceeds to step 416, where the processor 102 of the user communication endpoint 101 using the messaging client module 103, the email checker 360 and the link detector 370 checks the email communication for any links provided within the email communication.

Methods known in the art enable the parsing of text according to defined patterns. The parsing of text can be performed in message section of the email communication. As illustrated in FIG. 5, the message section of the email communication may include, for example, compose surface 512. According to further embodiments of the present disclosure, parsing of the text can also be performed in one or more attachments for the email communication. As illustrated in FIG. 5, the attached documents "Business_Plan.pdf" and "Attachment_A.pdf" are parsed to determine if a link is provided in the attached documents. According to a further embodiment of the present disclosure, parsing of text of the email communication may include forwarded email message(s) or attachment(s) of the email communication. For example, if an email message is forwarded to a user, the text for the forwarded email message(s) and any forwarded attachment(s) are parsed for any links provided in the email communication. In this case, the sender of the original email (i.e., the sender of the forwarded email message) may also receive a notification that at least one link is provided within the email communication.

Many computing devices implement application programming interfaces which assist in the parsing, analysis, and comparison of textual elements to known textual patterns. According to embodiments of the present disclosure, the link detector 370 illustrated in FIG. 3 assists in the parsing, analysis, and comparison of textual elements. One example of such a programming interface is a "regular expression engine," which assists in the matching of a series of letters and symbols in a given text (in this case, the link URL) to known pattern templates. Examples of regular expression engines are Perl, PCRE, PHP, .NET, Java, JavaScript, XRegExp, VBScript, Python, Ruby, Delphi, R, Tcl, and POSIX, available across a variety of computing devices. An example URL link may an IP-address such as http://10.129.180.36/releases/targets/10.1.0.2/build1). Other methods of matching a series of letters and symbols to a known pattern are possible. In some embodiments of the present disclosure, parsing must be performed to determine if the text contains a link to a file. One method is to determine if the text contains the identifying characters "www", "http://", "https://", "ftp://", "tftp://", "scp://", "gopher://" or "file://", indicating that a URL might be present within the text. The pattern matching techniques described above may assist in identifying the presence of such textual indicators. As illustrated in FIG. 5, link 508 includes "https://link.com".

In some embodiments of the present disclosure, document types can be identified by their "file extension," which is a series of letters or symbols at the end of the filename, sometimes after a final "period" symbol. Examples may include ".co", ".in", ".org", ".gov", ".edu", ".mil", ".uk", ".de", ".blog", ".net" or ".int".

After checking the email communication for any links provided within the email communication at step 416, method 400 proceeds to decision step 420, where the processor 102 of the user communication endpoint 101 using the messaging client module 103, the email checker 360 and the link detector 370 determine if there is a link found. If there are no links found (NO) at decision step 420, method 400 proceeds to step 440, where the processor 102 of the user communication endpoint 101 using the messaging client module 103 transmits the email communication. After transmitting the email communication at step 440, method 400 ends with END operation at step 444.

If there are links found (YES) at decision step 420, method 400 proceeds to step 424, where the processor 102 of the user communication endpoint 101 using the messaging client module 103 and user interface 304, provide notice that at least one or more links have been found. After notification has been provided that at least one or more links have been found at step 424, method 400 proceeds to decision step 428, where the processor 102 of the user communication endpoint 101 using the messaging client module 103 and user interface 304, determine if permission for each link has been established. If permission for each link has been established (YES) at decision step 428, method 400 proceeds to step 440, where the processor 102 of the user communication endpoint 101 using the messaging client module 103 transmits the email communication. After transmitting the email communication at step 440, method 400 ends with END operation at step 444.

If permission for each link has not been established (NO) at decision step 428, method 400 proceeds to step 432, where the processor 102 of the user communication endpoint 101 using the messaging client module 103 and the user interface 304, receive permission for each of the links. According to embodiments of the present disclosure, receiving permission for each of the links includes receiving permission for each of the recipients for each of the links. After receiving permission for each of the links at step 432, method 400 proceeds to step 436, where the processor 102 of the user communication endpoint 101 using the messaging client module 103, provides the permission for each link in the email communication. After providing the permission for each link in the email communication, method 400 proceeds to step 440, where the processor 102 of the user communication endpoint 101 using the messaging client module 103 transmits the email communication. After transmitting the email communication at step 440, method 400 ends with END operation at step 444.

Figure 6:
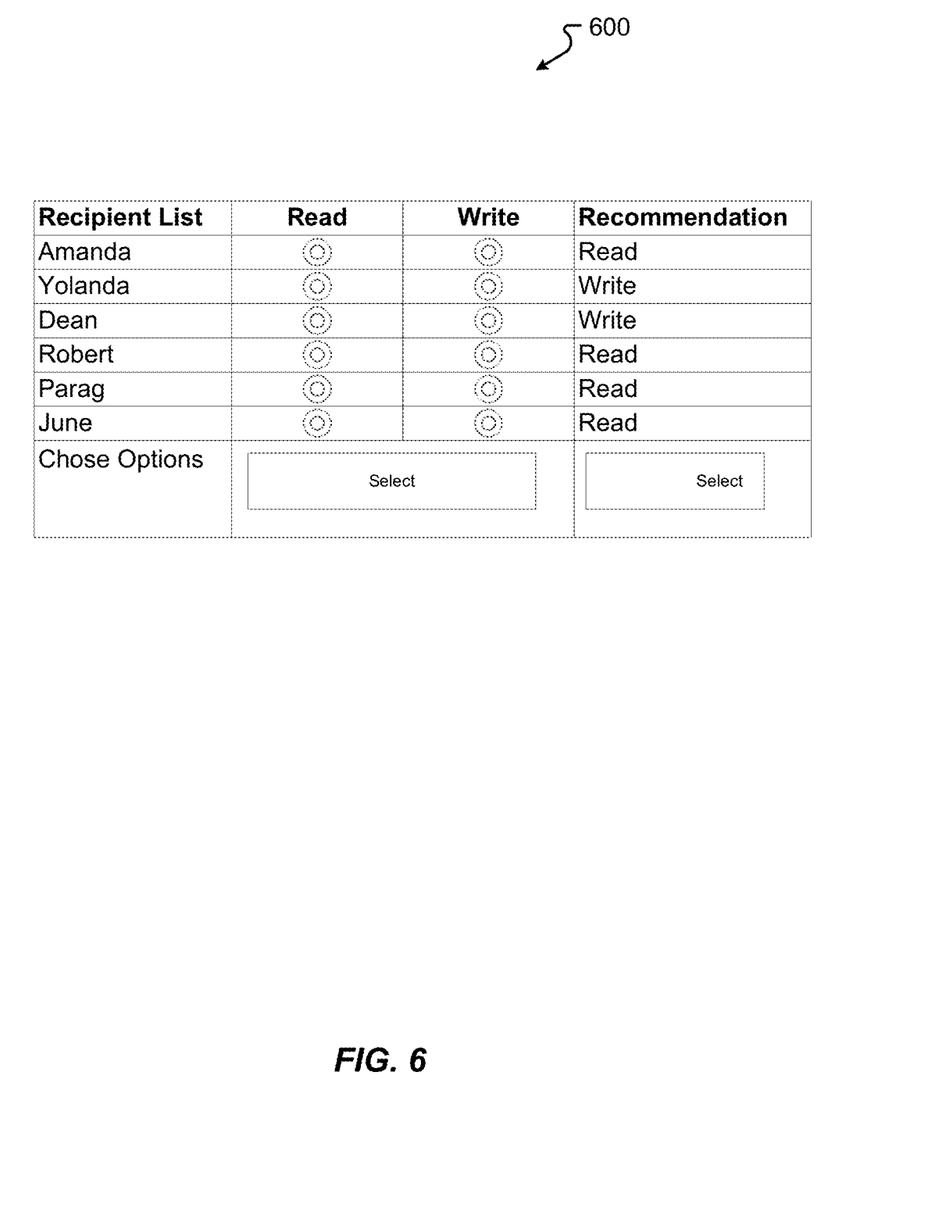
FIG. 6 is a diagram of a user interface for receiving recipient permissions set by a sender of an email communication according to an embodiment of the present disclosure.

FIG. 6 is a diagram of a user interface 600 for receiving recipient permissions set by a sender of an email communication according to an embodiment of the present disclosure. As illustrated in FIG. 6, different permissions (e.g., read, write or both) can be selected for each recipient. Moreover, and according to an embodiment of the present disclosure, a recommendation may be provided for each of the recipients. For example, recipient Ananda is recommended for the read permission, recipient Yolanda is recommended for the write permission, recipient Dean is recommended for the write permission, recipient Robert is recommended for the read permission, recipient Parag is recommended for the read permission, and recipient June is recommended for the read permission. The sender can either accept some, all or none of the recommended permissions or provide a permission for each of the recipients.

According to embodiments of the present disclosure, application programming interface (API) security issues may arise while performing the features identified above. The Representational State Transfer Architectural (REST) APIs are created for accessing or reading permissions. The REST APIs already support secured methods using the following ways: Based on Type and Role https://developers.google.com/drive/api/v3/manage-sharing and Key based access https://developers.google.com/drive/api/v3/resource-keys.

type. The type identifies the scope of the permission (user, group, domain, or anyone). A permission with a type of user applies to a specific user whereas a permission with a type of domain applies to everyone in a specific domain.

role. The role field identifies the operations that the type can perform. For example, a permission with a type of user and a role of a reader, grants a specific user read-only access to the file or folder. A permission with a type of domain and the role of commenter grants everyone in the domain the ability to add comments to a file. For a complete list of roles and the operations permitted by each, refer to Roles.

DropBox APIs allow access to feature such as file uploading, downloading, sharing, and searching. https://www.dropbox.com/developers/documentation/http/documentation. In general, the Dropbox API uses HTTP POST requests with JSON arguments and JSON responses. Request authentication is via OAuth 2.0 using the Authorization request header or authorization URL parameter.

Microsoft APIs: https://docs.microsoft.com/en-us/sharepoint/dev/sp-add-ins/authorization-code-oauth-flow-for-sharepoint-add-ins. The OAuth authentication and authorization flow for a SharePoint add-in requesting permissions on the fly. The flow is called the Authorization Code flow. The sequence describes how an add-in that isn't launched from within SharePoint can access resources in SharePoint. According to embodiments of the present disclosure, SharePoint can be a website, a document(s), sheet(s), a Power Point (PPT) document, a Portable Document Format (PDF) document, a binary file or an executable file.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Any of the steps, functions, and operations discussed herein can be performed continuously and automatically.

The exemplary systems and methods of this disclosure have been described in relation to communications systems and components and methods for monitoring, enhancing, and embellishing communications and messages. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a method for notifying a sender of an email communication having a link provided therein, to include permission for accessing the link includes receiving an indication of a completion of a formation of an email communication. The method also includes identifying at least one link provided within the email communication. The method further includes sending a notification to the sender that the at least one link is provided within the email communication.

Aspects of the above method further include prompting the sender to provide permission for accessing the at least one link.

Aspects of the above method further include receiving the permission for accessing the at least one link.

Aspects of the above method further include providing the permission for accessing the at least one link in the email communication.

Aspects of the above method include wherein receiving an indication of a completion of an email communication includes receiving a send command.

Aspects of the above method include wherein identifying at least one link provided within the email communication includes parsing a message section of the email communication for identifying characters.

Aspects of the above method include wherein the identifying characters include www, http://, https://, ftp://, tftp:// or scp://.

Aspects of the above method include wherein the notification is a popup notification.

Aspects of the above method include wherein the permission for accessing the at least one link includes a read permission and a write permission.

Aspects of the above method include wherein identifying at least one link provided within the email communication further includes parsing an attachment for the email communication for the identifying characters.

Aspects of the above method further include providing a template for the sender to compose the email communication.

Embodiments of the present disclosure include a system for notifying a sender of an email communication having a link provided therein, to include permission for accessing the link. The system includes a memory and at least one processor, coupled to the memory. The at least one processor is operative to receive an indication of a completion of a formation of an email communication, identify at least one link provided within the email communication and send a notification to the sender that the at least one link is provided within the email communication.

Aspects of the above system include wherein the at least one processor is operative to prompt the sender to provide permission for accessing the at least one link.

Aspects of the above system include wherein the at least one processor is operative to receive the permission for accessing the at least one link.

Aspects of the above system include wherein the at least one processor is operative to provide the permission for accessing the at least one link in the email communication.

Aspects of the above system include wherein receiving an indication of a completion of an email communication includes receiving a send command.

Aspects of the above system include wherein identifying at least one link provided within the email communication includes parsing a message section of the email communication for identifying characters.

Aspects of the above system include wherein the identifying characters include www, http://, https://, ftp://, tftp:// or scp://.

Aspects of the above system include wherein identifying at least one link provided within the email communication further includes parsing an attachment for the email communication for the identifying characters.

Embodiments of the present disclosure include computer-readable storage device having instructions stored thereon that, in response to execution, cause a processor to perform operations including receiving an indication of a completion of a formation of an email communication, identifying at least one link provided within the email communication and sending a notification to the sender that the at least one link is provided within the email communication.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A method for notifying a sender of an email communication having a link provided therein, to include permission for accessing the link, comprising:
receiving an indication of a completion of a formation of an email communication;
identifying at least one link provided within an attachment document of the email communication by parsing the attachment document of the email communication for identifying characters of the at least one link; and
sending a notification to the sender that the at least one link is provided within the attachment document of the email communication,
wherein the email communication is part of an email thread including an original forwarded email communication and notification is sent to a sender of the original forwarded email communication that at least one link is provided within an attachment document of the original forwarded email communication.

2. The method according to claim 1, further comprising prompting the sender to provide permission for accessing the at least one link.

3. The method according to claim 2, further comprising receiving the permission for accessing the at least one link.

4. The method according to claim 3, further comprising providing the permission for accessing the at least one link in the email communication.

5. The method according to claim 2, wherein the permission for accessing the at least one link includes a read permission and a write permission.

6. The method according to claim 1, wherein receiving an indication of a completion of an email communication includes receiving a send command.

7. The method according to claim 1, wherein the identifying characters include ftp://, tftp:// or scp://.

8. The method according to claim 1, wherein the notification is a popup notification.

9. The method according to claim 1, further comprising providing a template for the sender to compose the email communication.

10. The method according to claim 1, wherein sending the notification to the sender that the at least one link is provided within the email communication includes sending an audible notification.

11. A system for notifying a sender of an email communication having a link provided therein, to include permission for accessing the link, comprising:
a memory; and
at least one processor, coupled to the memory, operative to:
receive an indication of a completion of a formation of an email communication;
identify at least one link provided within an attachment document of the email communication by parsing the attachment document of the email communication for identifying characters of the at least one link; and
send a notification to the sender that the at least one link is provided within the attachment document of the email communication,
wherein the email communication is part of an email thread including an original forwarded email communication and notification is sent to a sender of the original forwarded email communication that at least one link is provided within an attachment document of the original forwarded email communication.

12. The system according to claim 11, wherein the at least one processor is operative to prompt the sender to provide permission for accessing the at least one link.

13. The system according to claim 12, wherein the at least one processor is operative to receive the permission for accessing the at least one link.

14. The system according to claim 13, wherein the at least one processor is operative to provide the permission for accessing the at least one link in the email communication.

15. The system according to claim 11, wherein receiving an indication of a completion of an email communication includes receiving a send command.

16. The system according to claim 11, wherein the identifying characters include ftp://, tftp:// or scp://.

17. A computer-readable storage device having instructions stored thereon that, in response to execution, cause a processor to perform operations comprising:
receiving an indication of a completion of a formation of an email communication;
identifying at least one link provided within an attachment document of the email communication by parsing the attachment document of the email communication for identifying characters of the at least one link; and
sending a notification to a sender that the at least one link is provided within the attachment document of the email communication,
wherein the email communication is part of an email thread including an original forwarded email communication and notification is sent to a sender of the original forwarded email communication that at least one link is provided within an attachment document of the original forwarded email communication.

18. The computer-readable storage device according to claim 17, wherein receiving an indication of a completion of an email communication includes receiving a send command.

19. The computer-readable storage device according to claim 17, wherein the identifying characters include ftp://, tftp:// or scp://.

20. The computer-readable storage device according to claim 17, wherein the notification is a popup notification.

* * * * *